(12) United States Patent
Jung et al.

(10) Patent No.: US 10,071,651 B2
(45) Date of Patent: Sep. 11, 2018

(54) TORQUE CONTROL APPARATUS AND METHOD FOR DRIVE MOTOR

(71) Applicants: Hyundai Motor Company, Seoul (KR); Kia Motors Corporation, Seoul (KR)

(72) Inventors: Jae Won Jung, Seoul (KR); Kyu Il Lee, Gyeonggi-do (KR); Kang Sik Jeon, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 404 days.

(21) Appl. No.: 14/540,283

(22) Filed: Nov. 13, 2014

(65) Prior Publication Data

US 2015/0352975 A1 Dec. 10, 2015

(30) Foreign Application Priority Data

Jun. 5, 2014 (KR) .................. 10-2014-0068252

(51) Int. Cl.
| | |
|---|---|
| *B60L 15/20* | (2006.01) |
| *B60L 3/00* | (2006.01) |
| *B60L 3/12* | (2006.01) |

(52) U.S. Cl.
CPC ............ *B60L 15/20* (2013.01); *B60L 3/0084* (2013.01); *B60L 3/12* (2013.01); *B60L 2240/423* (2013.01); *B60L 2250/26* (2013.01); *Y02T 10/645* (2013.01); *Y02T 10/7275* (2013.01)

(58) Field of Classification Search
None
See application file for complete search history.

(56) References Cited

U.S. PATENT DOCUMENTS

| | | | |
|---|---|---|---|
| 2006/0166784 A1* | 7/2006 | Tabata | B60K 6/445 477/37 |
| 2011/0153132 A1* | 6/2011 | Jiang | B60L 15/20 701/22 |
| 2015/0377162 A1* | 12/2015 | Kamioka | F02D 29/02 701/112 |

FOREIGN PATENT DOCUMENTS

| | | |
|---|---|---|
| JP | 2006-189050 A | 7/2006 |
| JP | 2012-087802 A | 5/2012 |
| KR | 10-2004-0056712 A | 7/2004 |
| KR | 10-2009-0075722 | 7/2009 |
| KR | 10-2012-0059260 | 6/2012 |
| KR | 10-2012-0067847 | 6/2012 |
| KR | 10-2012-0077498 | 7/2012 |
| WO | 2009/001452 A1 | 12/2008 |

* cited by examiner

*Primary Examiner* — Jelani A Smith
*Assistant Examiner* — Paul A Castro
(74) *Attorney, Agent, or Firm* — Mintz Levin Cohn Ferris Glovsky and Popeo, P.C.; Peter F. Corless

(57) ABSTRACT

A torque control method for a drive motor includes detecting, by a controller, an amount an accelerator pedal is pressed. The method also includes calculating a rate of change of the accelerator pedal based on the detected amount the accelerator pedal is pressed. Further, the method also includes determining a time constant of a drive motor corresponding to the calculated rate of change.

14 Claims, 7 Drawing Sheets

TORQUE CONTROL APPARATUS AND METHOD FOR DRIVE MOTOR

CROSS REFERENCE TO RELATED APPLICATION

The present application claims priority to Korean Patent Application No. 10-2014-0068252, filed Jun. 5, 2014, the entire contents of which is incorporated herein by reference.

BACKGROUND

Technical Field

The present disclosure relates to a torque control apparatus and method for a drive motor and, more particularly, to a torque control apparatus and method for a drive motor which changes a time constant of an electrical motor in response to an action of an accelerator pedal to prevent an abrupt change in torque or a delay in to the acceleration of a vehicle driven by the electric motor.

Description of the Related Art

Within an electric or hybrid vehicle (e.g., a vehicle driven by an electric motor), a target torque is generally determined based on the operation of an accelerator pedal. The target torque is filtered to protect a driving system from impact or to ensure smooth operation of a vehicle before it is transmitted to a motor control unit (MCU), which then starts the motor. In a related art, this filtering process has been performed by maintaining a time constant at a previously fixed value.

However, the control over the time constant may fail under various accelerator pedal operation conditions. For example, filtering at a low operation condition may improve response but the driving system may be subjected to impact from torque change while converting reverse torque, which exists during regenerative braking, into forward torque, which exists during cruising (e.g., when a vehicle is neither accelerating nor decelerating). Alternatively, filtering at a high operation condition may prevent impact from torque change but significantly decreases vehicle response to the accelerator pedal.

The information disclosed in this section is merely for the enhancement of understanding of the background of the disclosure, and should not be taken as an acknowledgment or as any form of suggestion that this information forms a prior art that would already be known to a person skilled in the art.

SUMMARY

The present disclosure provides a torque control apparatus for a drive motor and method that may calculate a target value of a time constant of a torque filter during acceleration by judging the rate the accelerator pedal is operated (e.g., pressed) such that torque control can be variably performed in response to the accelerator pedal being operated.

An objective of the present disclosure provides a torque control method for a drive motor that may include: detecting an amount an accelerator pedal is pressed, calculating an accelerator pedal rate of change based on the detected amount the accelerator pedal is pressed; and determining a time constant of a drive motor of a vehicle corresponding to the calculated rate of change.

The calculating of the rate of change of the accelerator pedal may further include calculating an amount of change of the accelerator pedal by comparing the detected amount the accelerator pedal is pressed with a previously-detected amount the accelerator pedal was pressed. Further, the calculating of the rate of change of the accelerator pedal may further include: a first setting step that may include: determining whether the accelerator pedal is currently in an acceleration state based on the detected amount of change; and setting the accelerator pedal to a tip-in mode when the accelerator pedal is in the acceleration state; a second setting step that may include: determining whether the accelerator pedal is currently in a deceleration state; and setting the accelerator pedal to a tip-out mode when the accelerator pedal is in the deceleration state; and a third setting step that may include: determining whether the accelerator pedal is in a substantially constant pressed state; and setting the accelerator pedal currently to a state-maintaining mode, in which the pressed state is maintained, when the accelerator pedal is in the substantially constant pressed state.

Further, the first setting step may include determining whether the amount of change is positive. Furthermore, at the first setting step, the calculated amount of change and a preset unit time may be accumulated when the amount of change is positive. The first setting step may also include: comparing the accumulated amount of change with a preset first reference cumulative value; determining whether the accelerator pedal is currently set to the tip-in mode; and setting the accelerator pedal to the tip-in mode when the accumulated amount of change is greater than the first reference cumulative value and the accelerator pedal is not currently set to the tip-in mode.

In addition, the second setting step may include determining whether the amount of change is negative. Further, at the second setting step, the calculated amount of change and a preset unit time may be accumulated when the amount of change is negative. The second setting step may also include: comparing the accumulated amount of change with the preset second reference cumulative value; determining whether the accelerator pedal is currently set to the tip-out mode; and setting the accelerator pedal to the tip-out mode when the accumulated amount of change is less than the second reference cumulative value and the accelerator pedal is not currently set to the tip-out mode.

Additionally, the third setting step may include: determining whether the amount of change is within a preset maintaining range; and determining whether the accelerator pedal is currently set to the state-maintaining mode when the amount of change is within the preset maintaining range. The third setting step may further include: comparing an accumulated time of a preset unit time with a preset reference time when the accelerator pedal is not currently set to the state-maintaining mode; and setting the accelerator pedal to the state-maintaining mode when the accumulated time of the preset unit time is greater than the preset reference time.

The calculating of the accelerator pedal rate of change may include calculating a rate of change of the change accumulated during the unit time at the first setting step or the second setting step. The time constant may be set to gradually decrease when the calculated rate of change is greater than a first reference rate of change that is set to a positive rate of change. The time constant may be set to gradually decrease as the calculated rate of change is smaller than a second reference rate of change that is set to a negative rate of change. The time constant may be set so that a first minimum time constant that is set to a positive rate of change is smaller than a second minimum time constant that is set to a positive rate of change.

The torque control method may further include: calculating a rate of change of the time constant during a preset change time of the determined time constant; and restricting the calculated rate of change of the time constant from exceeding a preset maximum rate of change of the time constant or from being less than a preset minimum rate of change of the time constant.

Another aspect of the present disclosure provides a torque control apparatus for a drive motor that may include: an accelerator pedal sensor configured to detect an amount an accelerator pedal is pressed; and a controller configured to: i) calculate a rate of change of the accelerator pedal based on the amount the accelerator pedal is pressed; and ii) determine a time constant of a drive motor of a vehicle that corresponds to the calculated rate of change.

The controller may further be configured to: calculate an amount of change of the accelerator pedal by comparing the detected amount the accelerator pedal is pressed with a previously-detected amount the accelerator was pressed, and set a position to which the accelerator pedal is to be pressed according to a size of the calculated amount of change, using a plurality of nodes.

According to the torque control apparatus for a drive motor and method therefor configured as set forth above, the time constant may be changed in response to the accelerator pedal being operated (e.g., pressed), whereby torque may smoothly change at an early stage of acceleration or when arriving at a target torque. In addition, during acceleration, it may be possible to arrive at the target torque within a shorter (e.g., less) time by decreasing the time constant, thereby improving vehicle response. Further, it may be possible to reduce impacts applied to a driving system during torque change by adjusting the motor control setting without a separate device, thereby also saving production costs.

BRIEF DESCRIPTION OF THE DRAWINGS

The above and other objects, features and advantages of the present disclosure will be more clearly understood from the following detailed description when taken in conjunction with the accompanying drawings, in which.

DETAILED DESCRIPTION

Figure 1A:
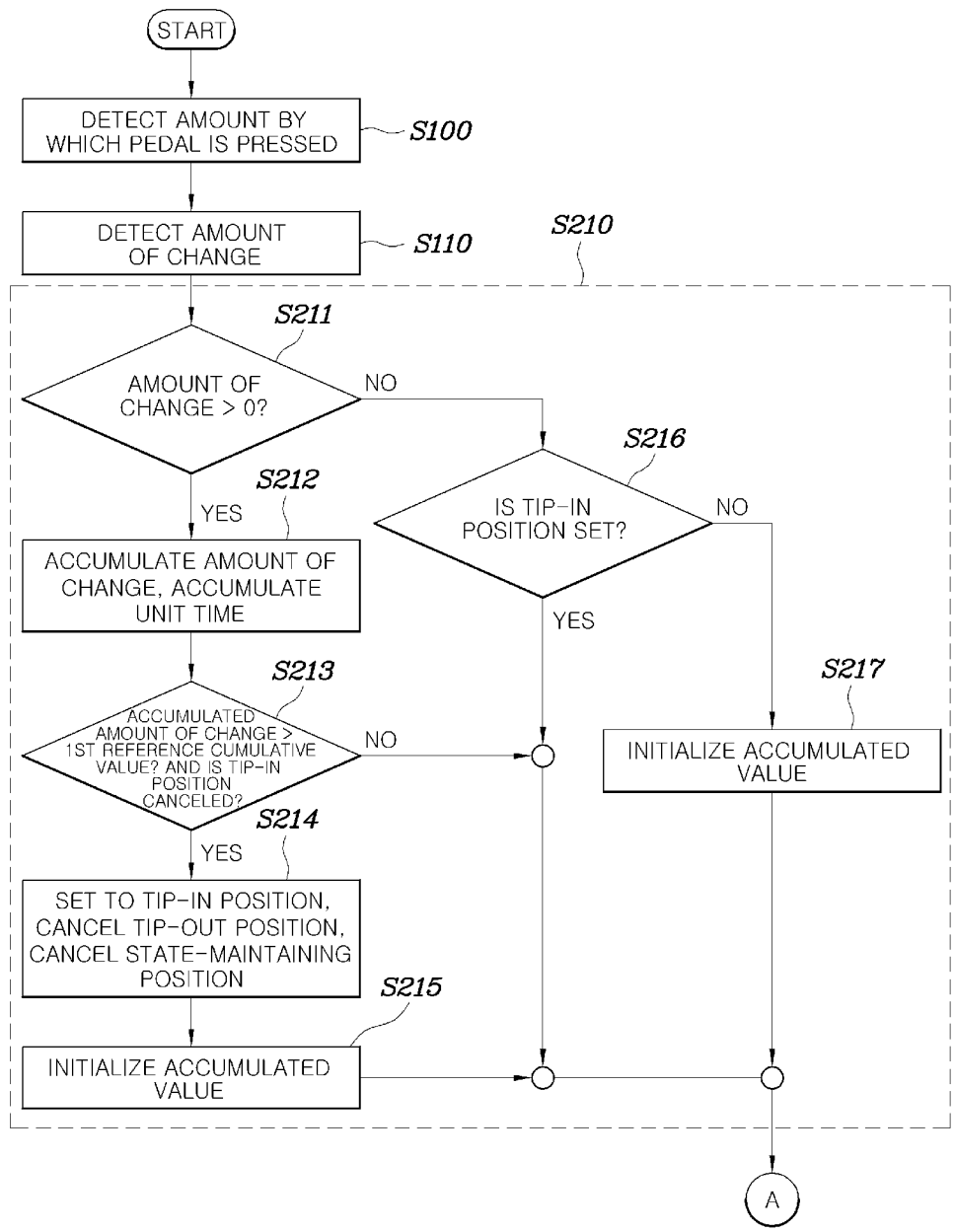
FIG. 1A to FIG. 1D are exemplary flowcharts that show a torque control method for a drive motor according to an exemplary embodiment of the present disclosure.
Figure 1B:
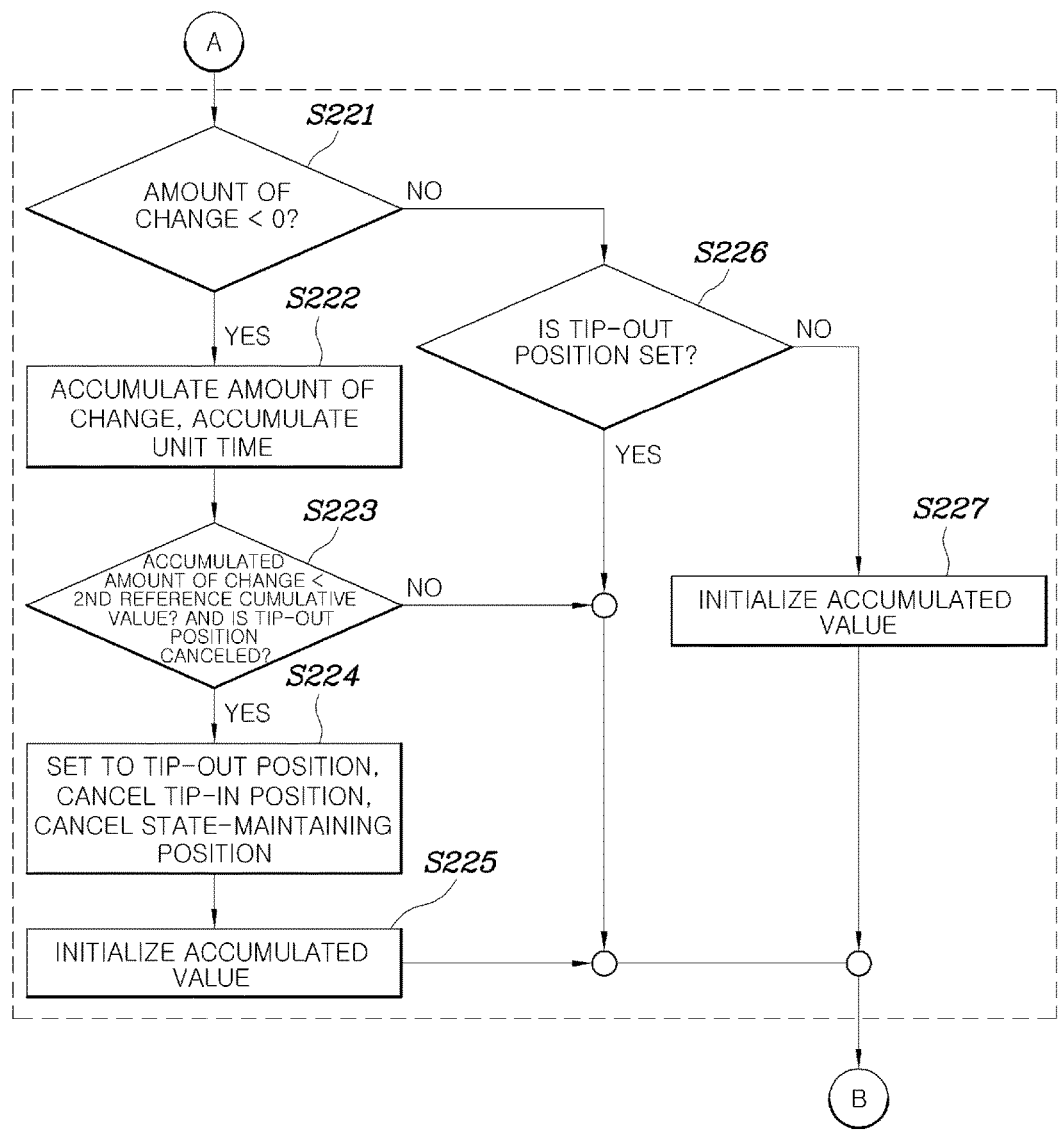
Figure 1C:
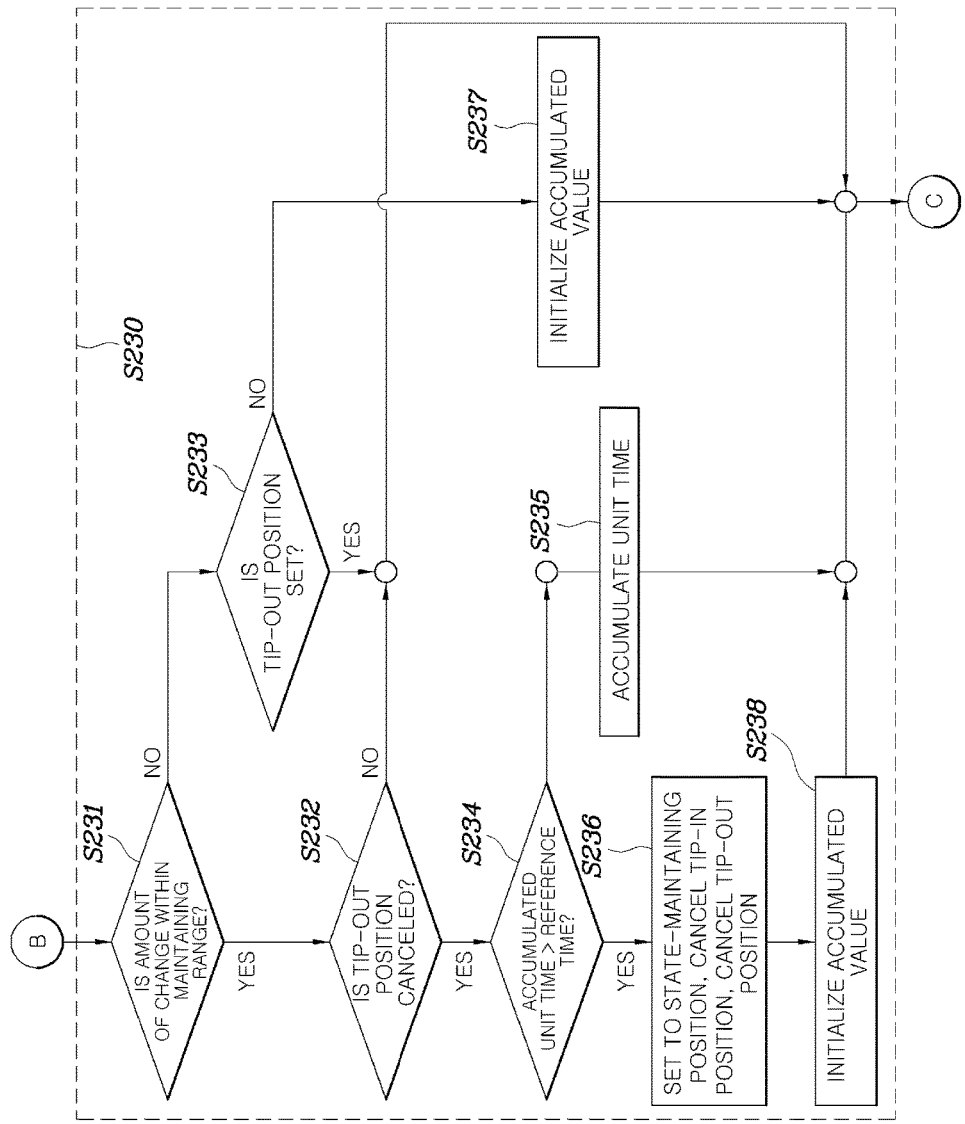
Figure 1D:
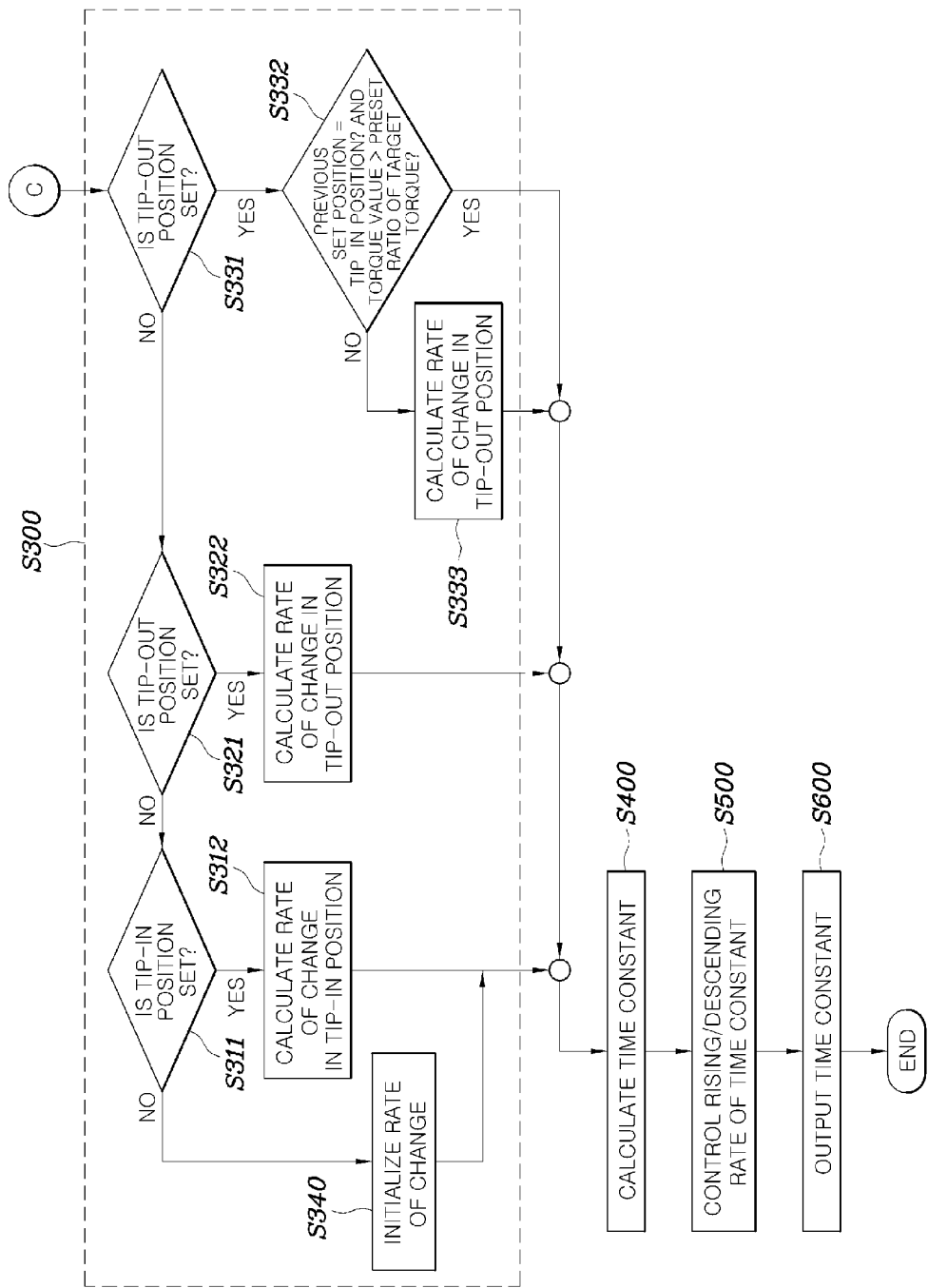

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

It is understood that the term controller may refer to a hardware device that includes a memory and a processor. The memory may be configured to store program instructions to perform the exemplary processes, and the processor is specifically configured to execute said program instructions to perform the processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will now be made in greater detail to a torque control apparatus for a drive motor and method therefor according to the present disclosure, exemplary embodiments of which are illustrated in the accompanying drawings. Wherever possible, the same reference numerals will be used throughout the drawings and the description to refer to the same or like parts.

FIG. 1A to FIG. 1D are exemplary flowcharts that show a torque control method for a drive motor according to an exemplary embodiment of the present disclosure. The torque control method may include: detecting an amount an accelerator pedal is pressed S100; calculating an accelerator pedal rate of change based on the detected amount the accelerator pedal is pressed S300; and determining a time constant of a drive motor of a vehicle corresponding to the calculated rate of change S400.

The method may further include calculating the amount of change of the accelerator pedal by comparing the detected amount the accelerator pedal is pressed with a previously-detected amount the accelerator pedal was pressed (S110). The amount of change may be calculated by subtracting the previously-detected amount the accelerator pedal was pressed from the detected amount the accelerator pedal is pressed. The detecting of the amount the accelerator pedal is pressed S100 and the calculating of the rate of change of the accelerator pedal S300 may complete operation cycles by intervals of preset time periods. The previously-detected amount the accelerator pedal was pressed may be an amount that was detected during a previous cycle (e.g., before the present cycle). The amount detected at present may be stored during the detecting the amount the accelerator pedal is pressed S100 to allow the detected amount to be used in a subsequent cycle (e.g., after the present cycle).

In addition, a first setting step S210, a second setting step S220 and a third setting step S230 may be executed. The first setting step S210 may include determining whether the accelerator pedal is currently in an acceleration state (e.g., when the pressure applied to the accelerator pedal increases) based on the detected amount of change (S211, S212 and S213), and when the accelerator pedal is in the acceleration state, setting the accelerator pedal to a tip-in mode S214. The second setting step S220 may include determining whether the accelerator pedal is in a deceleration state (e.g., when a pressure on the accelerator pedal is reduced) based on the detected amount of change (S221, S222 and S223), and when the accelerator pedal is in the deceleration state, setting the accelerator pedal to a tip-out mode S224. The third setting step S230 may include determining whether the accelerator pedal is currently maintained at a substantially constant pressed state based on the amount of change (S231, S232 and S234), and when the accelerator pedal is in the substantially constant pressed state, setting the accelerator pedal to a state-maintaining mode (e.g., when the pressure on the accelerator pedal is substantially constant) S236.

The first setting step S210 may determine whether the calculated amount of change is a positive value S211. When the calculated amount of change is positive, the calculated amount of change and a preset unit time may be accumulated S212. The accumulated amount of change may be compared with a preset first reference cumulative value and determined whether the accelerator pedal is currently set to the tip-in mode S213. When the amount of change is greater than the first reference cumulative value and the accelerator pedal is not currently set to the tip-in mode, the accelerator pedal may be set to the tip-in mode S214.

The positive amount of change may indicate that the detected amount the pedal is pressed is greater than the amount that was detected before the present cycle. This may be interpreted as more pressure is being applied to the accelerator pedal to accelerate the vehicle.

In addition, the first reference cumulative value may an accumulated value based on experiments and the needs of a manufacturer. This value may help determine when additional pressure is being applied to the accelerator pedal to accelerate the vehicle. The unit time may be a unit time while the amount of change of the accelerator pedal is detected. The unit time and the first reference cumulative value may be changed based on various conditions. Furthermore, it should be understood that a unit time and a reference cumulative value at the second setting step S220 and the third setting step S230 may also vary as necessary.

When the accelerator pedal is set to the tip-in mode, the tip-out mode or the state-maintaining mode set in a previous cycle may be canceled. In addition, at the first setting step S210, when the amount of change is negative, a tip-in mode setting may be determined S216. When the tip-in mode is not currently set, the amount of change and the unit time accumulated previously may be reset S217, and either the tip-out mode or the state-maintaining mode may be maintained. Here, the term "reset" means that the value is initialized to zero (0).

The second setting step S220 may include determining whether the amount of change is a negative value S221, and when the amount of change is negative, accumulating the calculated amount of change and the preset unit time S222. The accumulating of the calculated amount of change and the preset unit time S220 may be performed separately from the accumulating of the amount of change and the unit time at the first setting step S210. The accumulated amount of change may be a negative value. In other words, the negative value of the accumulated amount of change may indicate less pressure is being applied to the accelerator pedal. The time interval of the preset unit time may be the same as at the first setting step S210.

The second setting step S220 may also include comparing the accumulated amount of change with the preset second reference cumulative value and determining whether the accelerator pedal is currently set to the tip-out mode (S223). Further, when the accumulated amount of change is smaller than the second reference cumulative value and the accelerator pedal is not currently set to the tip-out mode, the accelerator pedal may be set to the tip-out mode (S224). Furthermore, the tip-in mode or the state-maintaining mode, which is set in a previous cycle, may be canceled.

In addition, the second setting step S220 may further include, when the amount of change is positive (e.g., not negative), determining a current tip-out mode setting S226. When the current tip-out mode out (e.g., not set), the rates of change and the unit times, which have been accumulated previously at the second setting step S220, may be reset S227, and the currently-set modes of the tip-in mode or the state-maintaining mode may be maintained.

The third setting step S230 may include determining whether the calculated amount of change is currently within a preset maintaining range S231, and when the amount of change is within the preset maintaining range, determining whether the accelerator pedal is currently set to the state-maintaining mode S232.

The preset maintaining range may be a range that includes negative and positive values. In other words, the preset maintaining range may include a value in which the amount of change is 0. For example, the maintaining range may be from about −2 to about 2. Of course, the maintaining range is not limited to the above-mentioned examples but can be set variously based on needs of a manufacturer. An amount of change within the maintaining range may mean the pressure applied to the accelerator pedal has remained substantially constant.

When the accelerator pedal is not currently set to the state-maintaining mode, the time obtained by accumulating the unit time in the previous cycles at the third setting step S230 may be compared with a preset reference time S234. When the accumulated time is greater than the preset reference time, the accelerator pedal may be set to the state-maintaining mode S236. Alternatively, if the accumulated time is less than the preset reference time, the unit time may be further accumulated S235. In other words, when the pressure applied to the accelerator pedal is substantially maintained for the reference time or longer, it may be determined that the accelerator pedal is in the state-maintaining mode, as opposed to the acceleration state or deceleration state, and the state of the accelerator pedal may be set to the state-maintaining mode S236.

At the third setting step S230, when the accelerator pedal is currently set to the state-maintaining mode, either the tip-in mode or tip-out mode set in a previous cycle may be canceled and the amount of change and the unit time, accumulated at the first setting step S210 and the second setting step S220 in a previous cycle, may be reset S238.

Additionally, at the third setting step S230, when the amount of change exceeds (e.g., not within) the preset maintaining range, it may be determined whether the state-maintaining mode is currently set S233. When the state-maintaining mode is not set, all of the accumulated times which have been accumulated previously at the third setting step S230 may be reset S237, and the currently-set mode of the tip-in mode or tip-out mode may be maintained.

Further, when the tip-in mode is set S214 at the first setting step S210, all of the rates of change and the unit times accumulated in the previous cycles at the second setting step S220 and the third setting step S230 may be reset S215. When the tip-out mode is set at the second setting step S220, all of the rates of change and the unit times accumulated in previous cycles at the first setting step S210 and the third setting step S230 may be reset S225.

Accordingly, after processes from the first setting step S210 to the third setting step S230 are executed, when the accelerator pedal is set to either the tip-out mode or the state-maintaining mode, all of the remaining modes and accumulated values corresponding to the remaining modes may be canceled or reset, making it possible to judge an ongoing change in the accelerator pedal.

In addition, the calculating of the rate of change of the accelerator pedal S300 may calculate the rate of change of the change accumulated during the accumulated unit time at the first setting step S210 or the second setting step S220. Further, the calculating of the rate of change of the accelerator pedal S300 may include: determining whether the accelerator pedal is in the state-maintaining mode S331, determining whether the accelerator pedal is in the tip-out mode S321 when the accelerator pedal is not in the state-maintaining mode, and determining whether the accelerator pedal is in the tip-in mode when the accelerator pedal is not in the tip-out mode S311. Of course, the sequence in which the processes of judgment are carried out may be changed.

When the accelerator pedal is in the tip-in mode S312, the rate of change may be calculated using the unit time and the amount of change accumulated at the first setting step S210. When the accelerator pedal is in the tip-out mode S322, the rate of change may be calculated using the unit time and the amount of change accumulated at the second setting step S220. In addition, when the accelerator pedal is set to the state-maintaining mode, the rate of change based on the amount of change may not be calculated S333 since the amount of change may not be accumulated at the third setting step S230.

Further, the method may include determining whether the set mode just before the present state-maintaining mode is the tip-in mode, and a torque value that is currently output from the motor may be further detected. When the mode set just before the present state is the tip-in mode, the method may include determining whether the detected torque value exceeds a preset ratio of a target torque S332. When the detected torque value exceeds the preset ratio, a rate of change calculated in the previous tip-in mode may be applied. When the mode set just before the present state is another mode (e.g., is not the tip-in mode) or the detected torque value does not exceed the preset ratio of the target torque, an output value of the rate of change may be zero (0).

A detailed description of the method of calculating the target torque based on the amount of pressure applied to the accelerator pedal will be omitted since this method is known to a person skilled in the art. In addition, the preset ratio may be set by a manufacturer using experiments such that the detected value may be judged to be substantially equal (e.g., approximately equal) to the target torque.

When the mode set just before the state-maintaining mode is the tip-in mode may indicate the pressure applied to the accelerator pedal may be substantially maintained (e.g., constant). When the detected torque value does not exceed the preset ratio, the output torque value may still follow the target torque. Even if the accelerator pedal is set to the state-maintaining mode, the torque value may continue to reach a target value while the rate of change is maintained. When the accelerator pedal is currently set to neither the tip-in mode, the tip-out mode, nor the state-maintaining mode, an output value of the rate of change may be zero S340.

Figure 2:
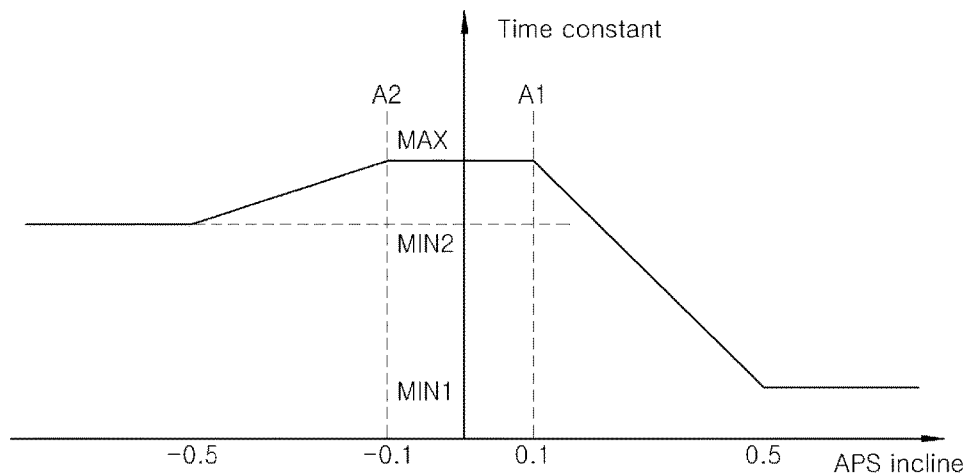
FIG. 2 is an exemplary graph that shows the relationship between a rate of change and a time constant according to an exemplary embodiment of the present disclosure.

The time constant may be a value used to filter a motor torque while determining the response of the motor. The time constant may correspond to the calculated rate of change. FIG. 2 is an exemplary graph showing the relationship between the rate of change and the time constant. As shown in FIG. 2, the time constant may gradually decrease when the calculated rate of change is greater than a first reference rate of change A1 and gradually increase when the calculated rate of change is smaller than a second reference rate of change A2. The first reference rate of change A1 may be a positive value and the second reference rate of change A2 may be a negative value. A reference time constant value MAX, which may be preset, may be maintained between the first reference rate of change A1 and the second reference rate of change A2. The time constant may be a basic value used to set the response of the motor and may have a variety of values based on the control environment of the motor and the needs of the manufacturer. Further, the first reference rate of change A1 and the second reference rate of change A2 may be values to determine whether pressure is applied to the accelerator pedal to accelerate the vehicle or pressure is removed from the accelerator pedal to decelerate the vehicle. The first and second reference rates of change A1 and A2 may be set to a variety of values based on the needs of the manufacturer and may also be determined using experiments.

A first minimum time constant MIN1 may be set to the positive rate of change, and a second minimum time constant MIN2 may be set to the negative rate of change. The first minimum time constant MIN1 may be smaller than the second minimum time constant MIN2. This may improve vehicle response during acceleration when pressure is applied to the accelerator pedal and smoothly change torque to reduce an impact caused by the change in torque when the vehicle is accelerated.

The method may also include a time constant limiting step S500. The time constant limiting step S500 may include calculating the rate of change of the determined time constant during a set change time and restricting the calculated rate of change of the time constant from exceeding a preset critical rising rate of change (e.g., a threshold rising rate of change of the time constant) or being less than a preset critical descending rate of change (e.g., a threshold descending rate of change of the time constant). Afterwards, outputting the time constant to the motor S600 may be executed.

At the time constant limiting step S500, the rising rate of the time constant due to an increase in the rate of change may be prevented from being lower than the set threshold descending rate of change, which may prevent an impact due to a change in torque when response is suddenly increased in response to a sudden change in the time constant. The rising rate of the time constant may also be prevented from exceeding the set threshold rising rate of change, which may prevent response from descending instantaneously. The threshold descending rate of change and the threshold rising rate of change may be set to a variety of values based on the needs of the manufacturer.

Figure 3A:
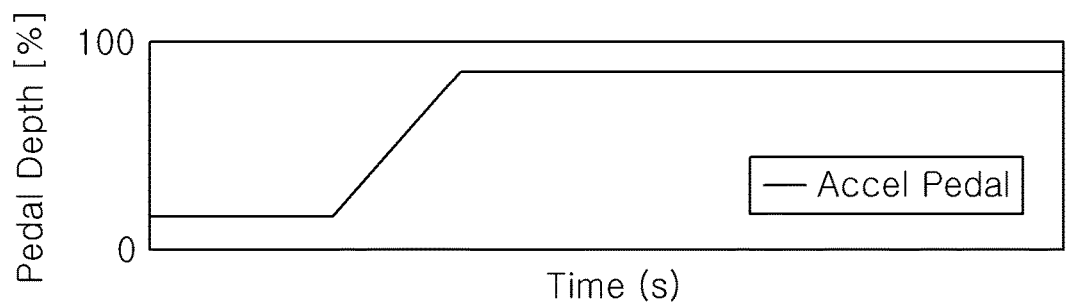
FIG. 3A to FIG. 3C are exemplary diagrams that show time constants and changes in torque based on changes in a rate the accelerator pedal is pressed according to an exemplary embodiment of the present disclosure.
Figure 3B:
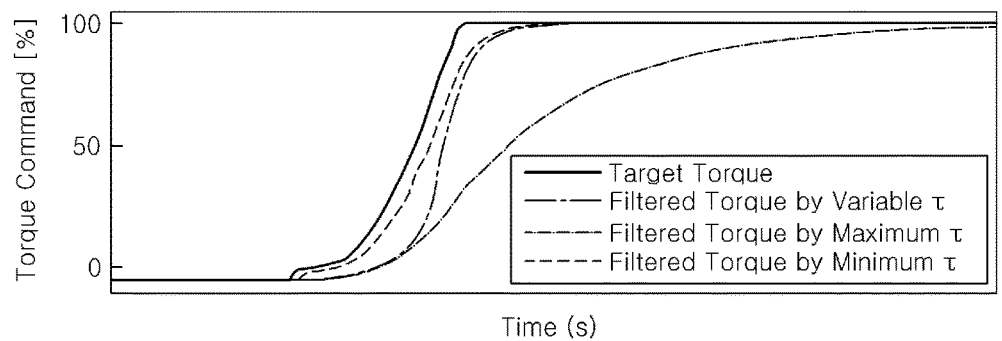
Figure 3C:
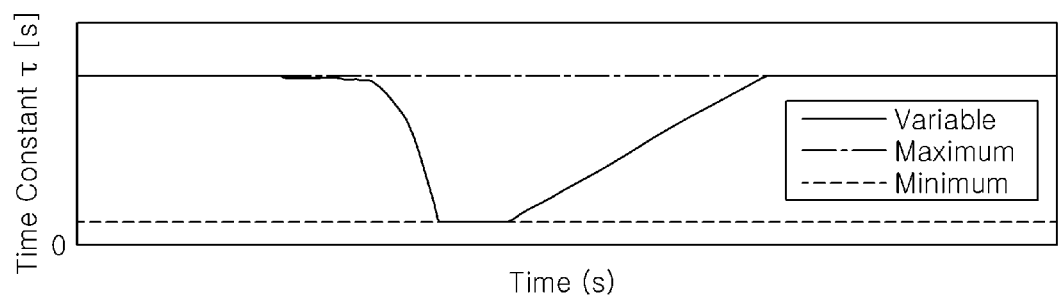

The effects of the torque control method for a drive motor according to an exemplary embodiment of the present disclosure will be described with reference to FIG. 3A to FIG. 3C. FIG. 3A to FIG. 3C illustrate acceleration after regenerative braking, in which FIG. 3A shows how much pressure is applied to the accelerator pedal, FIG. 3B shows changes in the time constant based on changes in the pressure applied to the accelerator pedal, and FIG. 3C is an exemplary diagram showing torque values instructed to the motor through the time constant limiting step S500.

When pressure is applied to the accelerator pedal, as shown in FIG. 3A, the accelerator pedal may be set to the tip-in mode, the rate of change may increase, and the time constant may decrease to the first minimum time constant, as shown in the diagram of FIG. 3C. At an early stage of the decrease in the time constant, a limitation in the threshold descending rate of change may cause the time constant to decrease gradually along an incline that is smoother than that of a later stage of the decrease in the time constant. Consequently, as shown in FIG. 3B, the instruction torque may exhibit a gentle rise at the early stage, followed by an exponential increase. In other words, since the torque smoothly changes at the early stage but rapidly follows the target torque after the early stage, response of the vehicle may be improved.

When the pressure applied to the accelerator pedal is a target amount, the instruction torque may not have arrived at the target torque yet. Since the instruction torque has not arrived at the set ratio of the target torque and the accelerator pedal is in the state-maintaining mode, the rate the pressure applied to the accelerator pedal may continue to increase. When the instruction torque comes into proximity with the target torque (e.g., becomes similar in value), the state-maintaining mode may be maintained. Consequently, the rate of change is about 1, and the time constant may return to the original value. Here, since the preset critical descending rate of change is restricted, the rate at which the time constant increases may be limited and may show a gradually-increasing incline, as shown in FIG. 3C. Therefore, while initial acceleration or pressure applied to the accelerator pedal is reduced, impacts may decrease and response may increase.

Figure 4:
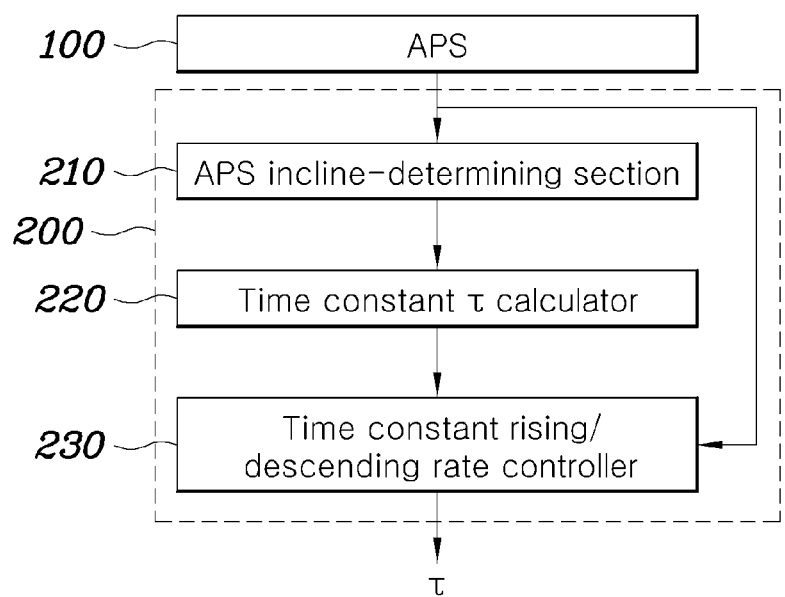
FIG. 4 is an exemplary block diagram of a torque control apparatus according to an exemplary embodiment of the present disclosure.

FIG. 4 is an exemplary block diagram showing a torque control apparatus for a drive motor according to an exemplary embodiment of the present disclosure. The torque control apparatus may include: an accelerator pedal sensor (APS) 100 configured to detect an amount the accelerator pedal is pressed; and a controller 200 configured to calculate a rate of change of the accelerator pedal based on the amount the accelerator pedal is pressed and determine a time constant of a drive motor of a vehicle that corresponds to the calculated rate of change.

More specifically, the controller 200 may be configured to calculate the rate of change of the accelerator pedal based on the detected amount the accelerator pedal is pressed using an accelerator pedal incline-determining section 210, determine the time constant of the motor corresponding to the calculated rate of change using a time constant calculator 220, and adjust the rising rate and the descending rate of the calculated time constant a time constant rising/descending rate controller 230.

The accelerator pedal incline-determining section 210 may be configured to calculate the amount of change of the accelerator pedal by comparing the detected amount the accelerator pedal is pressed with the previously-detected amount the accelerator was pressed. The accelerator pedal incline-determining section 210 may have a plurality of modes for setting positions to which the accelerator pedal is to be pressed based on the calculated amount of change. The plurality of set modes may include an acceleration mode when the accelerator pedal is set to a tip-in mode (e.g., when the pressure applied to the accelerator pedal is increasing); a maintaining mode when the accelerator pedal is set to the state-maintaining mode (e.g., when the pressure applied to the accelerator pedal is substantially maintained); and a canceling mode when the accelerator pedal is set to the tip-out mode (e.g., when pressure applied to the accelerator pedal is decreasing). The rates of change of the accelerator pedal may be calculated based on the positions that are set according to the respective modes. In other words, the first, second and third setting steps S210, S220 and S230 may be performed in the acceleration mode, the maintaining mode and the canceling mode.

In addition, the time constant calculator 220 may be configured to receive the rate of change of the accelerator pedal from the accelerator pedal incline-determining section 210 and determine the time constant corresponding to the input rate of change based on a preset map of rates of change and time constants. This process may be performed similar to the determining of the time constant of the motor which drives the vehicle S400.

Further, the time constant output from the time constant calculator 220 may be sent to the motor via the time constant rising/descending rate controller 230 as a time constant that has a limited increasing speed. This operation may be performed in a fashion similar to the time constant limiting step S500. Accordingly, the control unit 200 may be configured to vary the time constant using the torque control method for a drive motor according to an exemplary embodiment of the present disclosure.

According to the torque control apparatus for a drive motor and method therefor configured as set forth above, the time constant may be changed in response to the accelerator pedal being operated, whereby torque may smoothly change at an early stage of acceleration or when being adjusted to a target torque. Further, during acceleration, the target torque may be reached within a shorter time by decreasing the time constant, which may improve vehicle response. Impacts from torque change that are applied to a driving system may be reduced by changing the motor control setting without a separate device, which may also reduce costs.

Although the exemplary embodiments of the present disclosure have been described for illustrative purposes, those skilled in the art will appreciate that various modifications, additions and substitutions are possible, without departing from the scope and spirit of the present disclosure as disclosed in the accompanying claims.

What is claimed is:

1. A torque control method for a drive motor, comprising:
  detecting, by a controller, an amount an accelerator pedal is pressed;
  calculating, by the controller, an accelerator pedal rate of change based on the detected amount the accelerator pedal is pressed;

determining, by the controller, a time constant of a drive motor of a vehicle corresponding to the calculated rate of change; and operating, by the controller, the drive motor based on the determined time constant, wherein the time constant gradually decreases when the calculated rate of change is greater than a first reference rate of change that is set to a positive rate of change, wherein the time constant gradually decreases when the calculated rate of change is smaller than a second reference rate of change that is set to a negative rate of change, and wherein the time constant is set such that a first minimum time constant that is set to the positive rate of change is less than a second minimum time constant that is set to the negative rate of change.

2. The torque control method according to claim 1, wherein the calculating of the rate of change of the accelerator pedal comprises calculating an amount of change of the accelerator pedal by comparing the detected amount the accelerator pedal is pressed with a previously-detected amount the accelerator pedal was pressed.

3. The torque control method according to claim 2, wherein the calculating of the rate of change of the accelerator pedal further comprises:
a first setting step comprising:
determining, by the controller, whether the accelerator pedal is currently in an acceleration state based on the detected amount of change and,
setting, by the controller, the accelerator pedal to a tip-in mode when the accelerator pedal is in the acceleration state;
a second setting step comprising:
determining, by the controller, whether the accelerator pedal is currently in a deceleration state and,
setting, by the controller, the accelerator pedal to a tip-out mode when the accelerator pedal is in the deceleration state; and
a third setting step comprising:
determining, by the controller, whether the accelerator pedal is currently in a substantially constant pressed state; and
setting, by the controller, the accelerator pedal currently to a state-maintaining mode when the accelerator pedal is currently in the substantially constant pressed state.

4. The torque control method according to claim 3, wherein the first setting step further comprises determining whether the amount of change is positive.

5. The torque control method according to claim 4, wherein the first setting step further comprises accumulating the calculated amount of change and a preset unit time when the amount of change is positive.

6. The torque control method according to claim 5, wherein the first setting step further comprises:
comparing, by the controller, the accumulated amount of change with a preset first reference cumulative value;
determining, by the controller, whether the accelerator pedal is currently set to the tip-in mode; and
setting, by the controller, the accelerator pedal to the tip-in mode when the accumulated amount of change is greater than the preset first reference cumulative value and the accelerator pedal is not currently set to the tip-in mode.

7. The torque control method according to claim 5, wherein the calculating of the rate of change of the accelerator pedal comprises calculating a rate of change of the amount of change that has been accumulated during the preset unit time that has been accumulated at the first setting step or the second setting step.

8. The torque control method according to claim 3, wherein the second setting step further comprises determining whether the amount of change is negative.

9. The torque control method according to claim 7, wherein the second setting step further comprises accumulating the calculated amount of change and a preset unit time when the amount of change is negative.

10. The torque control method according to claim 8, wherein the second setting step further comprises:
comparing, by the controller, the accumulated amount of change with the preset second reference cumulative value;
determining, by the controller, whether the accelerator pedal is currently set to the tip-out mode; and
setting, by the controller, the accelerator pedal to the tip-out mode when the accumulated amount of change is less than the preset second reference cumulative value and the accelerator pedal is not currently set to the tip-out mode.

11. The torque control method according to claim 8, wherein the calculating of the rate of change of the accelerator pedal comprises calculating a rate of change of the amount of change that has been accumulated during the preset unit time that has been accumulated at the first setting step or the second setting step.

12. The torque control method according to claim 3, wherein the third setting step further comprises:
determining, by the controller, whether the amount of change is within a preset maintaining range; and
determining, by the controller, whether the accelerator pedal is currently set to the state-maintaining mode when the amount of change is within the preset maintaining range.

13. The torque control method according to claim 10, wherein the third setting step further comprises:
comparing, by the controller, an accumulated time of a preset unit time with a preset reference time when the accelerator pedal is not currently set to the state-maintaining mode; and
setting, by the controller, the accelerator pedal to the state-maintaining mode when the accumulated time of the preset unit time is greater than the preset reference time.

14. The torque control method according to claim 1, further comprising:
calculating, by the controller, a rate of change of the time constant during a preset change time of the determined time constant; and
restricting, by the controller, the calculated rate of change of the time constant from exceeding a preset maximum rate of change of the time constant or from being less than a preset minimum rate of change of the time constant.

* * * * *